Patented Apr. 16, 1946

2,398,454

UNITED STATES PATENT OFFICE 2,398,454

ANTHRAQUINONE COMPOUNDS

Edmund B. Towne, Joseph B. Dickey, and John R. Byers, Jr., Rochester, N. Y., assignors to Eastman Kodak Company, Rochester, N. Y., a corporation of New Jersey No Drawing. Application March 18, 1944, Serial No. 527,146

6 Claims. (Cl. 260—379)

This invention relates to anthraquinone compounds and more particularly to anthraquinone compounds containing both alkoxyalkylamino and hydroxyalkylamino groups, and to a process for preparing such anthraquinone compounds.

In United States Patent 2,255,045, dated September 9, 1941, there are described anthraquinone dyes containing a $\beta$-methoxyethylamino or a $\beta$-ethoxyethylamino in the 1-position and, in the 4-position, a $\beta$-methoxyethylamino, a $\beta$-ethoxyethylamino, a methylamino, an ethylamino, a propylamino or a butylamino group. These dyes are excellent for the direct dyeing of fabrics made of cellulose ester rayon, but are not so suitable for printing such fabrics, owing to the fact that, under the conditions of temperature and moisture necessary for printing, the dye sublimes from the point of application to some portion of the fabric where no dye has been applied.

We have now discovered new anthraquinone dyes containing in the 1-position, a $\beta$-hydroxyethylamino, a $\beta$-hydroxypropylamino group or a $\gamma$-hydroxypropylamino group, and in the 4-position a $\beta$-methoxyethylamino group, a $\beta$-ethoxyethylamino group, a $\beta$-methoxyisopropylamino group, a $\beta$-ethoxyisopropylamino group, a $\gamma$-methoxy-n-propylamino group or a $\gamma$-ethoxy-n-propylamino group. These new dyes are not only excellent for the direct dyeing from aqueous suspensions of fabrics made of cellulose ester rayon but are likewise excellent for the printing of such fabrics and do not suffer from the disabilities of the dyes of U. S. Patent 2,255,045 in printing processes.

We have found that our new dyes can be prepared by condensing leucoquinizarin or a mixture of leucoquinizarin and quinizarin with a mixture of $\beta$-hydroxyethylamine, $\beta$-hydroxypropylamine, or $\gamma$-hydroxypropylamine and $\beta$-methoxyethylamine, $\beta$-ethoxyethylamine, $\beta$-methoxyisopropylamine, $\beta$-ethoxyisopropylamine, $\gamma$-methoxy-n-propylamine or $\gamma$-ethoxy-n-propylamine. The dyes have been found to have superior properties if the amines are condensed simultaneously, or better if the hydroxyalkylamine is condensed first, followed by the alkoxyalkylamine. Moreover, we have found that if the hydroxyalkylamine and alkoxyalkylamine are employed in equimolecular ratio, the dye products in some cases tend to be gummy. Furthermore, by employing the hydroxyalkylamine and alkoxyalkylamine in other than an equimolecular ratio, we have found that dyes are obtained which dye celullose ester rayon more rapidly than do the dyes obtained by using the hydroxyalkylamine and alkoxyalkylamine in substantially equimolecular ratio. The best dyes are obtained using a molecular ratio of hydroxyalkylamine to alkoxyalkylamine which varies from 2:8 to 8:2, excluding an equimolecular ratio. Most advantageously the molecular ratio of hydroxyalkylamine to alkoxyalkylamine is from 3:7 to 4:6 or from 7:3 to 6:4, we have found. From 1 to 1.25 molecular proportions of total amines for each molecular proportion of leucoquinizarin or mixture of leucoquinizarin and quinizarin are advantageously employed.

The condensations are advantageously effected in the presence of a medium, such as water, pyridine, methanol, ethanol, n-propanol, isopropanol, n-butanol, isobutanol, or tetrahydrofurfuryl alcohol for example.

The following examples will serve to illustrate our new dyes and the manner of obtaining the same. In the formulas in these examples, the molecular ratio of amines employed in preparing the dyes is indicated in parentheses following the hydroxyalkylamino group and the alkoxyalkylamino group.

*Example 1.*— 1 - ($\beta$ - hydroxyethylamino)-4-($\beta$-methoxyisopropylamino)-anthraquinone

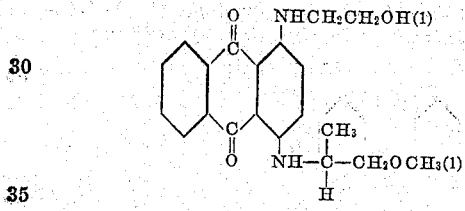

In a 12-liter flask were placed 388 g. (1.6 moles) of leucoquinizarin, 576 g. (2.4 moles) of quinizarin, 70 g. of sodium bicarbonate and 4 liters of n-butanol. The flask was equipped with a stirrer and reflux condenser. Stirring was started, and the slurry was heated to 60° C. There was then added a mixture of 256 g. (4.2 moles) of ethanolamine and 354 g. (4.2 moles) of $\beta$-methoxyisopropylamine during a period of one hour. The whole was then heated and stirred at gentle reflux for 12 hours. The reaction mass changed color from the brown of the quinizarin to red to the blue of the partially oxidized dye. Oxidation was completed by adding one liter of water to the reaction mixture, and then, in portions, 280 g. of sodium perborate. After the perborate had been slowly added, the whole was refluxed for 2 hours. While hot, the resulting blue solution was poured into 30 gallons of 1 per cent (by weight) aqueous sodium hydroxide solution with stirring. This slurry was heated by direct steam to 60° C. and filtered at 60° C. After washing the steamed slurry with hot water and drying, there was obtained 775 g. (54.7 per cent yield) of a very water-insoluble dye which can be represented by the above formula. The dye melted at 170° to 180° C. and dyes, by either immersion dyeing or printing, cellulose acetate rayon, a bright blue shade.

*Example 2.—1-(β-hydroxyethylamino)-4-(β-methoxyethylamino)-anthraquinone*

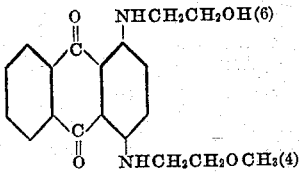

In a 3-liter flask, fitted with a reflux condenser and stirrer, were placed 242 g. (1 mole) of leucoquinizarin, 17.5 g. of sodium bicarbonate and 800 g. of n-butanol. Stirring was started, the mixture was gently refluxed and 76.9 g. (1.2 moles + 5 per cent) of ethanolamine were added dropwise over a period of one hour. Then 63.0 g. (0.8 mole + 5 per cent) of β-methoxyethylamine were added while stirring and gently refluxing. The whole was then refluxed quietly for one hour and then oxidized by adding portionwise 175 g. of sodium perborate. (Oxidation can also be accomplished by passing air into the mixture until oxidation is complete.). The mixture was then poured with vigorous stirring into 13 liters of cold water. The dye was filtered off, washed with cold water, and dried. The dye, thus obtained, was then ground with a suitable dispersing agent (e. g. a sodium lignin sulfonate) and is an excellent printing mixture for fabrics made of or containing cellulose ester rayon. The dye colors cellulose ester rayon a bright blue.

In a similar manner, 1-(β-hydroxyethylamino)-4-(β-ethoxyethylamino)-anthraquinone was prepared using 74.7 g. of β-ethoxyethylamine instead of 63 g. of β-methoxyethylamine. This dye likewise colored cellulose ester rayon a bright blue.

*Example 3. — 1-(β-hydroxypropylamino)-4-(β-methoxyisopropylamino)-anthraquinone*

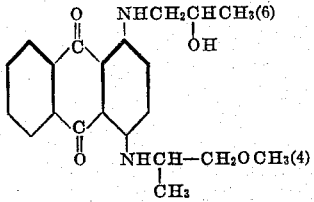

In a 3-liter flask, fitted with a reflux condenser and a stirrer, were placed 242 g. (1 mole) of leucoquinizarin, 17 g. of sodium bicarbonate and 800 g. of n-butanol. Stirring was started, the mixture was gently refluxed and 94.5 g. (1.2 moles + 5 per cent excess) of β-hydroxypropylamine were added propwise with stirring over a period of one hour. Then the 74.7 g. (0.8 mole + 5 per cent excess) of β-methoxyisopropylamine were added over a period of one hour, while stirring and gently refluxing. The whole was then refluxed quietly for 10 hours and then oxidized by passing air into the reaction mixture until no further color change took place. The mixture was then poured with vigorous stirring into about 13 liters of cold water. The dye was filtered off, washed with cold water and dried.

In a similar manner, 1-(β-hydroxypropylamino)-4-(β-ethoxyethylamino) - anthraquinone was prepared using 74.7 g. of β-ethoxyethylamine instead of 74.7 g. of β-methoxyisopropylamine. Both of these dyes color cellulose ester rayon a bright blue.

The anthraquinone dyes of our invention are especially useful for the coloration of organic derivatives of cellulose which include the hydrolyzed, as well as the unhydrolyzed, cellulose carboxylic esters, such as cellulose acetate, cellulose propionate and cellulose butyrate, and the hydrolyzed, as well as the unhydrolyzed, mixed carboxylic esters of cellulose, such as cellulose acetate-propionate and cellulose acetate-butyrate, and the cellulose ethers, such as methyl cellulose, ethyl cellulose and benzyl cellulose.

The anthraquinone dyes of our invention can be applied to the coloration of fabrics made of or containing organic derivatives of cellulose, such as cellulose acetate rayon, by the known dyeing or printing methods. In accordance with the known dispersion method of dyeing, the anthraquinone dyes are first ground to a fine powder, intimately mixed with a suitable dispersing or solubilizing agent, following which the resulting mixture is added to water or a dilute solution of soap in water to form an aqueous dye bath. The textile materials are then immersed in such a dye bath in accordance with known procedures. Suitable dispersing or solubilizing agents include soap, sulforicinoleic acid, the alkali metal salts of sulforicinoleic acid, sulfonated oleic, stearic or palmitic acid or salts thereof, such as the sodium or ammonium salts. For printing, our new dyes are advantageously ground with a suitable dispersing agent, such as a sodium lignin sulfonate and the resulting printing mixture is then applied to the textile materials, in accordance with known printing methods.

γ-Methoxy-n-propylamine and γ-ethoxy-n-propylamine can be prepared by hydrogenating β-methoxypropiononitrile or β-ethoxypropiononitrile, in the presence of a nickel hydrogenation catalyst, in accordance with the methods set forth by Adkins in "Reactions of Hydrogen with Organic Compounds Over Copper-Chromium Oxide and Nickel Catalysts," p. 53–55 (1937), University of Wisconsin Press. β-Methoxyisopropylamine and β-ethoxyisopropylamine can be prepared by heating the corresponding alcohols with ammonia, in the presence of a metallic hydrogenation catalyst, in accordance with the method of Ernst and Mack, U. S. Patent 1,982,985, dated December 4, 1934. β-Methoxyisopropyl alcohol and β-ethoxyisopropyl alcohol can be prepared according to the method described by Cox, Nelson and Cretcher, Journal of the American Chemical Society, 49, 1080 (1927).

What we claim as our invention and desire to be secured by Letters Patent of the United States is:

1. The anthraquinone dye mixture obtained by oxidation of the product obtained by condensing a hydroxyalkylamine selected from the group consisting of β-hydroxyethylamine, β-hydroxypropylamine and γ-hydroxypropylamine, and an alkoxyalkylamine selected from the group consisting of β-methoxyethylamine, β-ethoxyethylamine, β-methoxyisopropylamine, β-ethoxyisopropylamine, γ-methoxy-n-propylamine and γ-ethoxy-n-propylamine, with a compound selected from the group consisting of leucoquinizarin and a mixture of quinizarin and leucoquinizarin, the molecular ratio of said hydroxyalkylamine to said alkoxyalkylamine being from about 3:7 to 4:6.

2. The anthraquinone dye mixture obtained by oxidation of the product obtained by condensing a hydroxyalkylamine selected from the group consisting of β-hydroxyethylamine, β-hydroxypropylamine and γ-hydroxypropylamine, and an alkoxyalkylamine selected from the group consisting of β-methoxyethylamine, β-ethoxyethylamine, β-methoxyisopropylamine, β-ethoxyisopropylamine, γ-methoxy-n-propylamine and γ-ethoxy-n-propylamine, with a compound selected from the group consisting of leucoquinizarin and a mixture of quinizarin and leucoquinizarin, the molecular ratio of said hydroxyalkylamine to said alkoxyalkylamine being from about 7:3 to 6:4.

3. The anthraquinone dye mixture obtained by oxidation of the product obtained by condensing β-hydroxyethylamine and β-methoxyethylamine with a compound selected from the group consisting of leucoquinizarin and a mixture of quinizarin and leucoquinizarin, the molecular ratio of said β-hydroxyethylamine to said β-methoxyethylamine being about 6:4.

4. The anthraquinone dye mixture obtained by oxidation of the product obtained by condensing β-hydroxypropylamine and β-methoxyisopropylamine with a compound selected from the group consisting of leucoquinizarin and a mixture of quinizarin and leucoquinizarin, the molecular ratio of said β-hydroxypropylamine to said β-methoxyisopropylamine being about 6:4.

5. The anthraquinone dye mixture obtained by oxidation of the product obtained by condensing β-hydroxyethylamine and β-ethoxyethylamine with a compound selected from the group consisting of leucoquinizarin and a mixture of quinizarin and leucoquinizarin, the molecular ratio of said β-hydroxyethylamine to said β-ethoxyethylamine being about 6:4.

6. The anthraquinone dye mixture obtained by oxidation of the product obtained by condensing a hydroxyalkylamine selected from the group consisting of β-hydroxyethylamine, β-hydroxypropylamine and γ-hydroxypropylamine, and an alkoxyalkylamine selected from the group consisting of β-methoxyethylamine, β-ethoxyethylamine, β-methoxyisopropylamine, β-ethoxyisopropylamine, γ-methoxy-n-propylamine and γ-ethoxy-n-propylamine, with a compound selected from the group consisting of leucoquinizarin and a mixture of quinizarin and leucoquinizarin, the molecular ratio of said hydroxyalkylamine to said alkoxyalkylamine being from about 3:7 to 4:6 or from about 7:3 to 6:4.

EDMUND B. TOWNE.
JOSEPH B. DICKEY.
JOHN R. BYERS, Jr.